April 17, 1928.

G. C. JETT 1,666,210

TRACTOR STEERING MECHANISM

Original Filed Sept. 27, 1922  3 Sheets-Sheet 1

Witness

Inventor:
George C. Jett
By

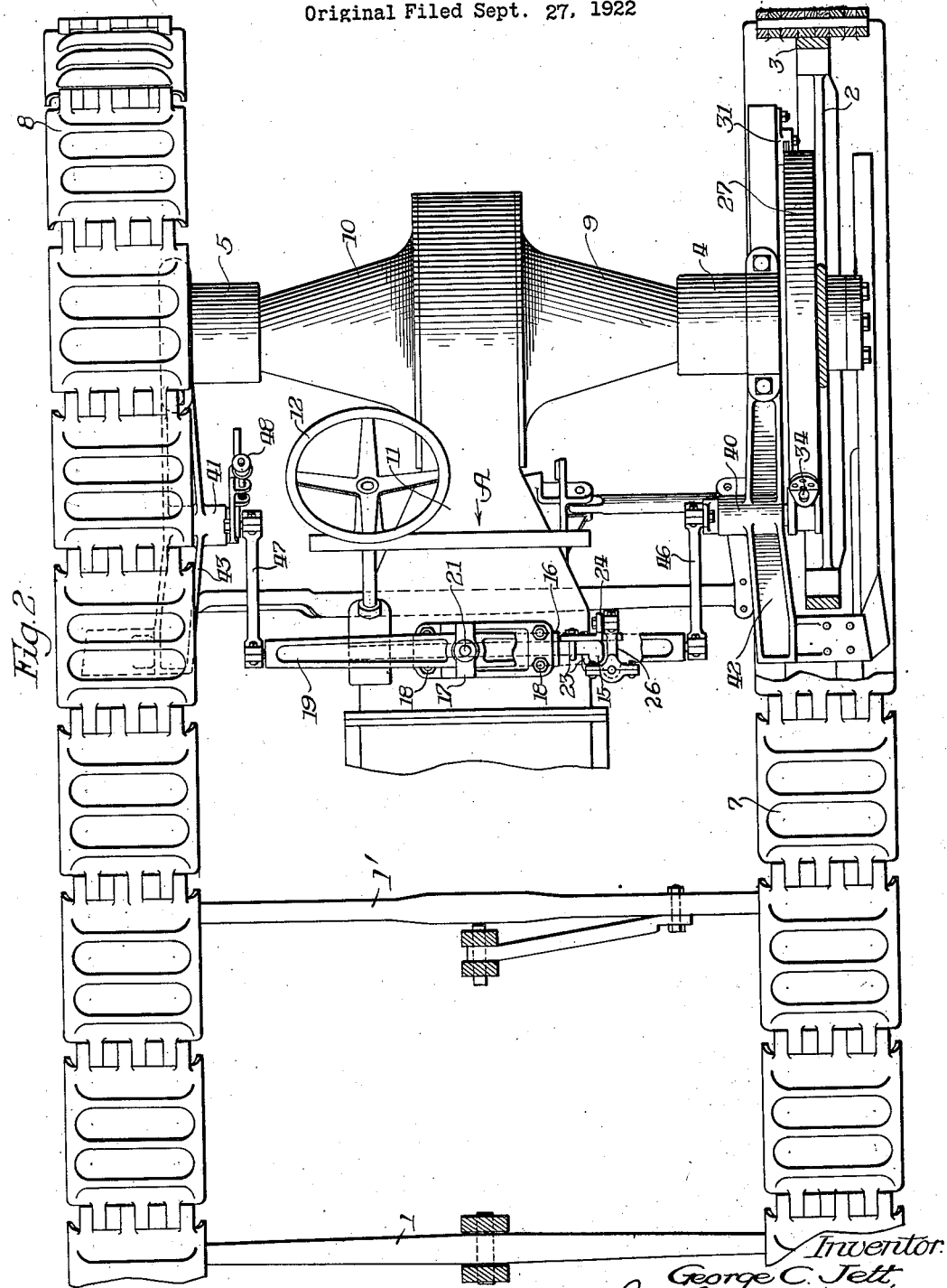

April 17, 1928.  
G. C. JETT  
1,666,210  
TRACTOR STEERING MECHANISM  
Original Filed Sept. 27, 1922   3 Sheets-Sheet 3
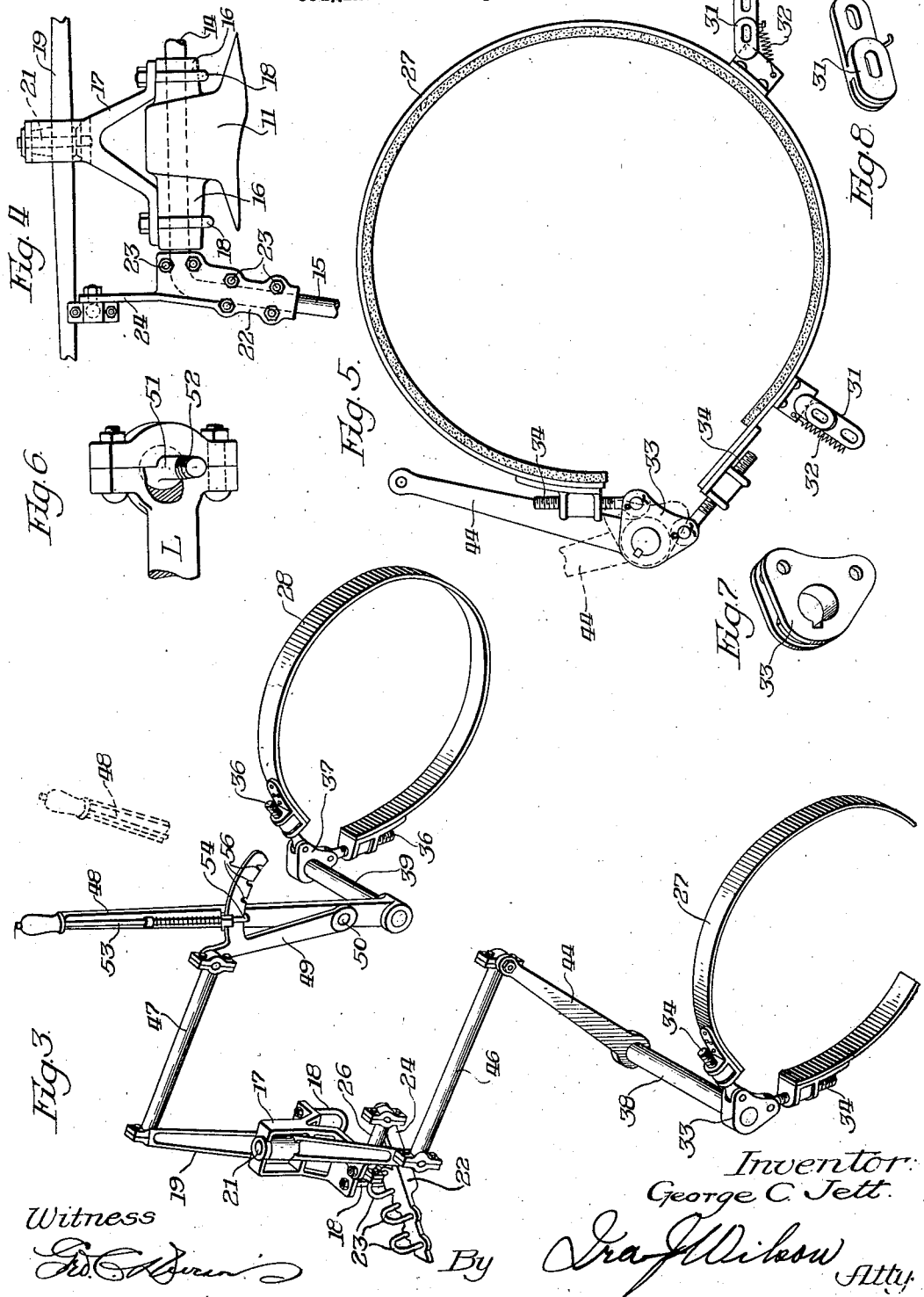
Witness  
Inventor  
George C. Jett.  
By Ira J. Wilson Atty.

Patented Apr. 17, 1928.

1,666,210

UNITED STATES PATENT OFFICE.

GEORGE C. JETT, OF MILWAUKEE, WISCONSIN, ASSIGNOR OF TWO-FIFTHS TO WALTER H. STIEMKE, OF MILWAUKEE, WISCONSIN.

TRACTOR STEERING MECHANISM.

Original application filed September 27, 1922, Serial No. 590,848. Divided and this application filed November 16, 1925. Serial No. 69,262.

The invention hereinafter disclosed relates generally to a steering control or steering mechanism for tractors and the like and has more particular reference to a steering mechanism peculiarly adapted to the endless chain tread type of tractor, such as that disclosed in my copending application, Serial No. 590,848, filed September 27, 1922, and entitled Creeper tractor mechanism, of which this application is a division.

One of the primary objects of this invention resides in the provision of steering control mechanism for tractors, or other vehicles to which by modification it may be adapted, which mechanism is capable of steering the vehicle to which it is applied by braking the driving mechanism thereof.

Another object is to provide mechanism of the above noted character capable of being readily substituted in lieu of certain portions of the steering gear with which the ordinary round wheel tractor or other vehicle is customarily equipped and capable of being easily connected to and disconnected from the usual steering wheel mechanism, such as a worm gear steering mechanism, so that the steering wheel and its mounting remain undisturbed as to structure, location and function.

A further object resides in the provision of mechanism adapted to serve both to steer the vehicle and to stop it or brake it.

A still further object is to provide steering mechanism for tractors and the like whereby the tractor or other vehicle may be turned in a narrow space substantially no greater than the length of the vehicle if the vehicle be turned on a single pivot point.

Many other objects and advantages of the invention, including novelties of construction and operation will be or should become apparent upon perusal of the following description and claims and from viewing the drawing in which:

Fig. 2 is a plan view of the mechanism illustrated in Fig. 1, further parts being broken away.

Fig. 3 is a perspective view of the steering control levers and brakes.

Fig. 4 is an elevation of the steering control lever fulcrum stand and associated mechanism looking in the direction indicated by arrow "A" on Fig. 2.

Fig. 5 is a detailed view of one of the steering control brake bands and its actuating mechanism.

Fig. 6 is an enlarged detailed view of the ball and socket joints used on the steering control levers.

Fig. 7 is an enlarged detailed perspective view of a brake actuating cam and

Fig. 8 is an enlarged detailed perspective view of a brake band supporting clip.

Figure 1:
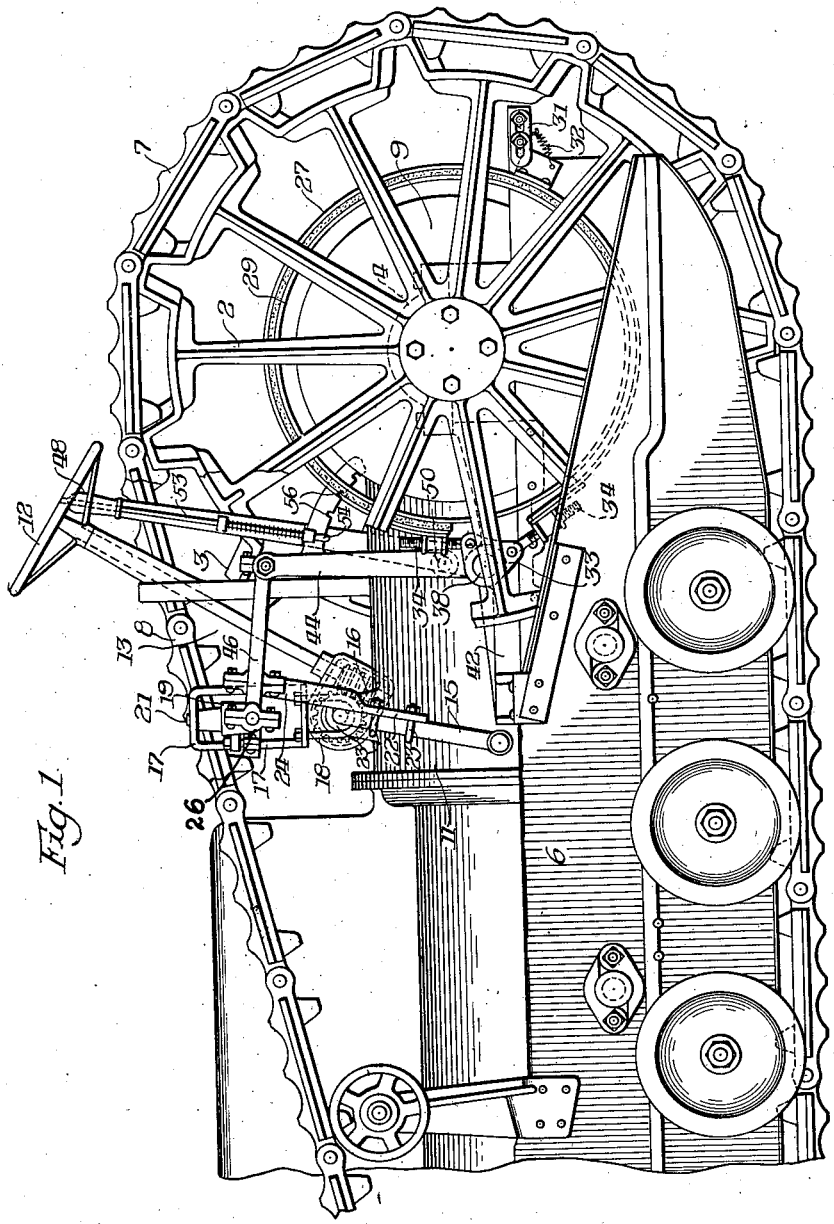
Fig. 1 is a side elevation of a portion of a creeper tractor mechanism embodying one form of my invention; certain portions of the tractor having been broken away to more clearly illustrate certain parts which would otherwise be concealed from view.

Referring to the drawings in detail, it will be observed that I have illustrated only the creeper tractor mechanism, having for the sake of clarity, omitted the tractor body including the power plant which may be of any well known or preferred construction. For the sake of illustration, however, I have shown portions of the transmission mechanism including the housings therefor, for a better understanding of the manner or mode in which my improved mechanism may be attached.

Since the general structure of the tractor illustrated in the present embodiment of my invention is more or less immaterial to the essence of the invention, and since it has been fully described in my copending application of which this is a division, to which reference may be had, I shall but briefly describe the tractor mechanism proper. As has been stated, the body itself may vary widely in its structural detail and the construction of the power plant is also more or less immaterial, since the present invention is chiefly concerned with a steering mechanism applicable to any vehicle driven through the medium of differential gearing or its equivalent.

The creeper tractor mechanism illustrated is designed to replace the four wheels of the ordinary round wheel tractor and comprises in general, front sprocket wheels and axles (not shown) and rear sprocket wheels 2 and 3 suitably mounted and journalled at 4 and 5 on the side frame member 6 (one only shown) of the tractor, which frame members are suitably held together in any preferred manner such as by cross members 1 and 1'. The sprocket wheels 2 and 3 serve to drive the endless chain treads 7 and 8, which pass over and drive the front sprocket wheels. The wheels 2 and 3 are in turn, driven through splined shafts, differential gearing and a torque shaft, as usual, or are designed to be driven through other suitable equivalent mechanism housed in housings 9, 10 and 11. A steering wheel 12 of any well known or preferred construction and steering mechanism including the steering post 13, are suitably attached to the body of the machine and operatively connected with a crank arm 14 bearing in bearing bosses 16, preferably formed integral with the transmission case 11. The crank arm 14 in the case of an ordinary round wheel tractor would be connected up with the steering knuckles in a manner well understood, but in the present instance, when the forward or steering wheels are removed, the connections between the crank arm 14 and the wheels are also removed.

The steering wheel 12 is customarily arranged, through suitable mechanism not shown, to oscillate the crank arm 14 as has been stated, but when a tractor is converted by the application of my invention thereto, the steering wheel and the operative connections between it and the crank arm 14 remain undisturbed and the wheel is employed in the usual manner for steering the creeper tractor or other vehicle, the steering mechanism for which will now be described.

Referring particularly to Figs. 1 to 4 inclusive, it will be observed that I have secured an upwardly extending fulcrum standard 17 upon the bearing bosses 16 by means of U-bolts 18 engaged about the bosses. This standard 17 is constructed to provide a fulcrum for a horizontally disposed lever 19 pivoted upon the fulcrum pin 21. The lever 19 is adapted to be swung on its fulcrum by movements of the arm 14 imparted by manipulation of the steering wheel in the usual manner, and in order to accomplish this result, a casting 22 has been provided which is adapted to be firmly secured by a plurality of U-bolts 23 to the crank arm extension 15 so as to partake of movements thereof. The casting 22 is provided with an upward extension 24 which is connected by a link 26 with the lever 19 so that swinging movements of the arm 14 will be directly transmitted to the lever.

Through suitable connections to be later described, movements of the lever 19 are transmitted to brake bands 27 and 28, which bands surround the brake drums 29 fixedly attached to the inner faces of the spokes of the rear creeper sprockets 2 and 3. The brake bands are supported by suitable clips 31 attached to the inner wall of each side frame 6, as shown in Figs. 1 and 2, and springs 32 are employed to withdraw the bands from the brake drums when the tension thereon is released. The brake band 27 is connected to an operating link or cam 33 through a pair of adjustable links 34 and the brake band 28 is similarly connected by links 36 to a similar cam 37. Cams 33 and 37 are keyed to rock shafts 38 and 39, and the shafts are mounted in suitable bearings 40 and 41 provided in elongated portions 42 and 43 of castings supporting the journals 4 and 5 of the rear axle. An arm 44 fixed to the inner end of shaft 38 projects upwardly and is connected by a link 46 with one end of the lever 19, while the other end of the lever 19 is connected through a link 47 with a compound lever connection attached to the shaft 39, which connection comprises a hand lever 48 fixed to shaft 39, and a sector carrying member 49 pivoted at 50 upon the hand lever 48 and connected at its upper end to the link 47, as clearly shown in Fig. 3. The links 26, 46 and 47 are preferably connected at their ends to their respective mechanisms by ball and socket connections, such as illustrated in Fig. 6, the socket being carried by the link L and the ball 51, in each instance being seated in the socket and having a threaded extension 52 adapted to be threadedly engaged with the lever to which connection is desired.

Assuming that it is desired to turn the tractor to the left, the steering wheel is manipulated in the customary manner so as to rock the shaft 14 and swing the lower end of the arm 15 upwardly, thereby through the extension 24 and the link 26, swinging the lever 19 in a counter-clockwise direction (viewing Fig. 3) about its fulcrum to swing the lever arm 44 in a clockwise direction or rearwardly into the position shown in full lines in Fig. 5, thereby compressing the brake band 27 around its brake drum to lock the left hand driving creeper sprocket 2. This same movement of the lever 19 releases the brake band 28 from its brake drum so that when power is applied to the rear axle through the differential (not shown), the right hand creeper driving sprocket will move forwardly while the left hand driving sprocket remains stationary, thereby turning the tractor to the left. When turning movement of the tractor to the right is desired, the steering wheel is turned in the opposite direction, thereby reversing the movement of the lever 19 and correspondingly reversing the action of the brake bands.

Since it is sometimes desirable to apply the brake bands simultaneously, provision for the accomplishment of this result is made in the hand lever 48 and the sector carrying member 49. Normally the hand lever and sector remain in the relative position shown in Fig. 3 and the whole structure operates as a rigid arm or lever similar in function in all respects to the arm 44. In order to apply both brake bands, the push rod 53 is depressed to release the detent 54 from its notch 56 and the hand lever 48 swung rearwardly relatively to the sector into the dotted line position shown also in Fig. 3, while the steering wheel is simultaneously or previously manipulated to apply the brake band 27. Brake band 27 is therefore applied in the usual manner and brake band 28 is applied at the same time through the manipulation of the lever 48 which may be locked to the sector in its rearward position by means of the detent and recesses 56, so that both brake bands are simultaneously locked in engagement with their respective brake drums.

It should be apparent from the foregoing that I have provided a tractor or other vehicle steering and braking mechanism which may be readily applied and easily operated. It is, as has been noted, particularly adapted to a standard round wheel tractor to convert such tractor into one of the creeper type. In making this change, the steering of the tractor is not affected for it is accomplished in the usual manner by manipulation of the customary steering wheel. The mounting of the steering wheel on the body of the tractor is not disturbed while the steering mechanism which supplants the front wheel steering gear is adapted to the double function of steering the tractor and braking it whenever occasion requires.

It is believed that the invention and its many inherent advantages will be clearly understood and appreciated from the foregoing description, and while a preferred embodiment has been illustrated and described, it should be manifest that resort may be had to many modifications and variations including changes in the structural details without departing from the essence or spirit of the invention defined in the following claims.

I claim:

1. A steering mechanism for vehicles having differentially driven driving wheels comprising, a steering wheel, a single brake member for each driving wheel operatively connected to said steering wheel for selective operation whereby rotation of said steering wheel in one direction will apply one of said brakes and in the other direction the other of said brakes, and means independent of and adjacent said steering wheel for applying one of said brakes when said steering wheel is operated to apply the other whereby said brakes may be applied simultaneously.

2. In combination with a vehicle having a prime-mover, driven axles, transmission mechanism between said prime-mover and axles, and means for driving said axles differentially, a steering control member, a single brake for each of said axles, and means connecting said brakes and control member for selective and simultaneous application of said brakes, said connecting means including means adjacent said control member for independent application of but one of said brakes independently of said control member.

3. A steering mechanism for vehicles having differentially driven driving wheels comprising, a steering wheel, a single brake member for each driving wheel operatively connected to said steering wheel for selective operation upon rotation of said steering wheel in opposite directions, whereby said brakes may be applied alternatively, and a brake lever to the right of said steering wheel as respects a driver of the vehicle, for applying one of said brakes when said steering wheel is turned to apply the other of said brakes, whereby said brakes may be applied simultaneously.

4. The combination with a tractor body provided with a rear axle carrying differentially driven creeper sprockets, a crank arm oscillatably mounted upon the tractor body, a steering wheel operatively connected to said arm, of a lever fulcrumed on said body, to move about an axis perpendicular to the axis of said oscillatable crank arm, means connecting said arm to said lever, whereby movement of said arm will be communicated to said lever, brake drums carried by said creeper sprockets, a brake band encircling each of said brake drums, means operably connecting said brake bands to opposite ends of said lever, whereby a braking action may be selectively imparted to said creeper sprockets.

5. The combination with a tractor body provided with a rear axle, a steering wheel and an oscillatably mounted crank arm operable by said wheel, of a lever, fulcrumed intermediate its ends on said body, a connection between said oscillatable arm and said lever at one side of the lever fulcrum, whereby oscillation of said arm will move said lever about its fulcrum, a pair of creeper sprockets mounted on said axle, means for differentially driving said creeper sprockets, braking means associated with each of said creeper sprockets, means connecting the opposite ends of said lever with the braking means for said creeper sprockets operable by movement of said lever, to selectively impart a braking action to either of said creeper sprockets.

6. The combination with a tractor body provided with a rear axle, a steering wheel and an oscillatably mounted crank arm operable by said wheel, of a lever, fulcrumed intermediate its ends on said body, a connection between said oscillatable arm and said lever at one side of the lever fulcrum, whereby oscillation of said arm will move said lever about its fulcrum, a pair of creeper sprockets mounted on said axle, means for differentially driving said creeper sprockets, braking means associated with each of said creeper sprockets, means connecting the opposite ends of said lever with the braking means for said creeper sprockets operable by movement of said lever, to selectively impart a braking action to either of said creeper sprockets, and manual means operatively connected with the braking means of one of such sprockets for imparting a braking action to such creeper sprocket, irrespective of movement of said lever.

7. An attachment for converting a steering mechanism for a four-wheel tractor into a steering mechanism for a full creeper tractor, comprising an elongated lever adapted to be fulcrumed intermediate its ends on the tractor body, detachable connecting means intermediate the conventional wheel steering mechanism and said lever for imparting movement to said lever, to cause the same to pivot about its fulcrum, means connecting the opposite ends of said lever with separate braking means for driven sprockets of said creeper tractor, whereby said lever may be actuated by the conventional steering mechanism, to selectively impart a braking action to the driven sprockets of the creeper tractor.

In witness of the foregoing I affix my signature.

GEORGE C. JETT.